(12) United States Patent  
Yu et al.

(10) Patent No.: US 9,309,127 B2  
(45) Date of Patent: Apr. 12, 2016

(54) METHOD OF FABRICATING MERCURY-REMOVING REAGENT HAVING LAYERS OF CARBONATES

(71) Applicant: Institute of Nuclear Energy Research, Atomic Energy Council, Executive Yuan, R.O.C., Taoyuan County (TW)

(72) Inventors: Ching-Tsung Yu, Taoyuan County (TW); Han Wen Cheng, Changhua County (TW); Hui-Mei Lin, Pingtung County (TW); Shu-San Hsiau, Taipei (TW)

(73) Assignee: INSTITUTE OF NUCLEAR ENERGY RESEARCH, ATOMIC ENERGY COUNCIL, Executive Yuan, R.O.C., Lungtan, Taoyuan (TW)

( * ) Notice: Subject to any disclaimer, the term of this patent is extended or adjusted under 35 U.S.C. 154(b) by 0 days.

(21) Appl. No.: 14/450,413

(22) Filed: Aug. 4, 2014

(65) Prior Publication Data
US 2016/0031717 A1     Feb. 4, 2016

(51) Int. Cl.
C01F 7/00     (2006.01)
C01F 11/18    (2006.01)
(Continued)

(52) U.S. Cl.
CPC ............ *C01F 7/001* (2013.01); *B01J 20/0222* (2013.01); *B01J 20/0225* (2013.01); *B01J 20/0229* (2013.01); *B01J 20/0237* (2013.01); *B01J 20/0248* (2013.01); *B01J 20/0277* (2013.01);
(Continued)

(58) Field of Classification Search
CPC .......... B01D 53/02; B01D 53/64; C01F 7/66; C01F 7/00; C01F 7/002; C01F 7/004
See application file for complete search history.

(56) References Cited

U.S. PATENT DOCUMENTS

| 5,840,792 A * | 11/1998 | Machimura ............. C01F 7/002 423/274 |
| 2010/0248956 A1* | 9/2010 | Yu et al. ............... 502/414 |
| 2013/0015399 A1* | 1/2013 | Yu et al. ............... 252/184 |

FOREIGN PATENT DOCUMENTS

| CN | 100564276 C | * 12/2009 | |
| VN | WO 2012078437 A1 | * 6/2012 | ............. B01J 23/007 |

OTHER PUBLICATIONS

English machine translation of CN100564276C.*
(Continued)

*Primary Examiner* — Richard M Rump
(74) *Attorney, Agent, or Firm* — Jackson IPG PLLC; Demian K. Jackson

(57) ABSTRACT

A reagent is provided for removing mercury (Hg). The reagent contains metal carbonates compound with layers structure. The contents of metals of reagent can be adjusted using this method. The reagent can be manufactured with kilogram grade per batch. The common ions, like Mg, Ca, Mn, Fe, Co, Ni, Cu, Zn, etc., can be contained in the reagent. The manufacture method provides a low-cost way for the Hg sorbent and the content ratio of metal oxides can be higher than 50 wt %. The manufacture is operated at a temperature more than 200° C. and can be integrated with existing technology such as denitration catalysts in industry for removing Hg. In another word, the present invention fabricates a mercury-removing reagent of metal-M/aluminum carbonates (M-Al—$CO_3$), which can be potentially combined with commercially selective catalytic reduction (SCR) catalysts for developing medium-high-temperature mercury-removing reagent with mercury-removing efficiency further enhanced.

1 Claim, 2 Drawing Sheets

(51) Int. Cl.
    C01G 45/00    (2006.01)
    C01G 49/00    (2006.01)
    C01G 53/06    (2006.01)
    C01G 51/06    (2006.01)
    C01G 3/00     (2006.01)
    C01G 9/00     (2006.01)
    B01J 20/02    (2006.01)
    B01J 20/04    (2006.01)
    B01J 20/30    (2006.01)

(52) U.S. Cl.
    CPC ............ *B01J 20/043* (2013.01); *B01J 20/3085* (2013.01); *C01F 11/182* (2013.01); *C01G 3/006* (2013.01); *C01G 9/006* (2013.01); *C01G 45/006* (2013.01); *C01G 49/009* (2013.01); *C01G 51/06* (2013.01); *C01G 53/06* (2013.01)

(56) References Cited

OTHER PUBLICATIONS

Kooli, Fathi, Vicente Rives, and William Jones. "Reduction of Ni2+-Al3+ and Cu2+-Al3+ layered double hydroxides to metallic Ni0 and CuO via polyol treatment." Chemistry of materials 9.10 (1997): 2231-2235.*

* cited by examiner

METHOD OF FABRICATING MERCURY-REMOVING REAGENT HAVING LAYERS OF CARBONATES

FIELD OF THE INVENTION

The present invention relates to a mercury-removing reagent; more particularly, relates to using coprecipitation method to fabricate a mercury-removing reagent, where a metal proportion can be adjusted and the reagent is kilogram grade per batch-manufactured to achieve a ratio of metal oxides higher than 50 wt % contained within.

BACKGROUND OF THE INVENTION

According to the report of United Nations, in 2010, data show that anthropogenic mercury emission generated by industries related to natural coal, mining, cement, steel and alkali chlorine shares a ratio up to 80 percents (%) of total global mercury emission, which is the largest source of mercury emission in the global environment. U.S. Environmental Protection Agency has announced mercury together with other toxic pollutants as prior control targets. The other nations like Taiwan, the EU, China and India also have control regulations, for mercury is one of the crucial indicators of world's first-class pollutants. The use of mercury-removing technologies, like combustion, gasification, etc., for fossil fuels becomes an important issue of global air pollution.

Main sources of mercury are emission from including fixed coal-fired power boilers, cogeneration boilers, cement kilns and city incinerators. Industrial mercury-containing wastes are mainly generated from coal industry, which may enter into environment through air and is bound to be regulated.

Modern mercury-removing technologies use activated-carbon bed or activated carbon injection (ACI) in flue gas for removing mercury. These technologies are operated below 100 celsius degrees (° C.) with shortcomings like low mercury concentration, high equipment cost, high energy consumption and non-regeneration. In 2008, a prior art was revealed that, by using a middle-aperture silicon substrate, mercury could be removed at 150° C. Another prior art is a wet mercury-removing technology, which usually uses equipments of selective catalytic reduction (SCR) combined with flue gas desulfurization (FGD) and is also a flue-gas mercury-removing technology. Because more energy is consumed for cooling and the desulfurized product would be combined with mercury, this technology may cause environmental pollution. Therefore, gasification-related technologies are currently under developed. Advantages of these gasification-related technologies include higher concentration, smaller equipment, higher equivalence and reuse. Besides, trace elements in dust and other wastes, which may cause secondary pollutions, are prevented from being generated during production. Toxicity of catalyst (like which comes from water gas shift reaction) is also avoided. These gasification-related technologies can be operates at 200° C. with more than 90% mercury-removing efficiency achieved.

The main concern of these technologies is to enhance the temperature up to 150~450° C. on using mercury-removing reagent. In the past, precious metals and rare-earth metals are usually used. For example, the U.S. NETL laboratory developed a palladium-aluminum (Pd—Al) material; Spain CSIC developed a gold-containing activated-carbon (Au-AC) material; and China developed cerium-dioxide-containing activated-carbon ($CeO_2$/AC), etc. However, mercury-removing technologies using precious metals and rare-earth metals have higher costs; and some metals, such as platinum (Pt), Pd, ruthenium (Ru), Au-AC, and $CeO_2$/AC, may easily cause recession in an oxidizing environment ($O_2$, HCl, $SO_2$ . . . ). Recently, transition metals are used, which are mostly impregnated in carriers, including Cu/HZSM-5 (Fuel Processing Technology 104 (2012) 325-331), $MnO_2$/Monoliths (Fuel 108 (2013) 13-18), and nano-ZnO (Journal of Fuel Chemistry and Technology, 41 (11) 2013, 41 (11): 1371-1377). These transition metals are widely used in industrial denitration catalysts. Their costs are also relatively inexpensive. These mercury-removing reagents are made by being attached to carriers, where single load of metal oxides is typically less than 50 wt % and has a greater difference between different types of metal oxides. As a result, adsorption capacity cannot be significantly improved in a fixed bed; and, surface abrasion in a fluid bed is also obvious.

Another prior art is form synthetic mercury-removing reagent into nano-particles for increasing surface areas, where, typically, a surface area bigger than 50 $m^2$/g must be added with more materials through more fabricating processes. Yet, their performance stabilities accompanied with temperature enhanced still need to be tested and evaluated.

Hence, the prior arts do not fulfill all users' requests on actual use.

SUMMARY OF THE INVENTION

The main purpose of the present invention is to use coprecipitation to fabricate a mercury-removing reagent, where a metal proportion can be adjusted and the reagent is kilogram-class batch-manufactured to obtain a ratio of metal oxides higher than 50 wt % contained within by combining common ions with cost saved.

Another purpose of the present invention is to provide a method of fabricating a mercury-removing reagent that capture Hg at a temperature higher than 200° C., where the reagent can be integrated with existing industrial denitration catalysts.

Another purpose of the present invention is to provide a mercury-removing reagent of metal-M/aluminum carbonates (M-Al—$CO_3$) to be integrated with existing SCR catalysts for medium-high-temperature dry-type mercury removal with mercury-removing temperature and mercury-removing efficiency enhanced.

To achieve the above purposes, the present invention is a method of fabricating a mercury-removing reagent having layers of carbonates, comprising steps of: (a) obtaining a plurality of acidic solutions of a metal M and aluminum, where the acidic solutions have different molar ratios of the metal M to aluminum (M:$Al^{3+}$) of 1~30:1; where aluminum is obtained from aluminum nitrate (Al($NO_3$)$_3$); and where the metal M is magnesium (Mg), calcium (Ca), manganese (Mn), iron (Fe), cobalt (Co), Nickel (Ni), copper (Cu) or zinc (Zn); (b) obtaining an alkaline solution of sodium hydroxide (NaOH) and sodium carbonate ($Na_2CO_3$); (c) mixing the acidic solutions with the alkaline solution to form precipitates of M-Al—$CO_3$ having the different molar ratios of M:$Al^{3+}$; and (d) after being dried and processed through solid-liquid separation, forming powders of M-Al—$CO_3$ having the different molar ratios of M:$Al^{3+}$ and calcining the powders of M-Al—$CO_3$ in a high-temperature furnace to obtain a mercury-removing reagent of M-Al—$CO_3$. Accordingly, a novel method of fabricating a mercury-removing reagent having layers of carbonates is obtained.

BRIEF DESCRIPTION OF THE DRAWINGS

The present invention will be better understood from the following detailed description of the preferred embodiment according to the present invention, taken in conjunction with the accompanying drawings, in which.

DESCRIPTION OF THE PREFERRED EMBODIMENT

The following description of the preferred embodiment is provided to understand the features and the structures of the present invention.

Figure 1:
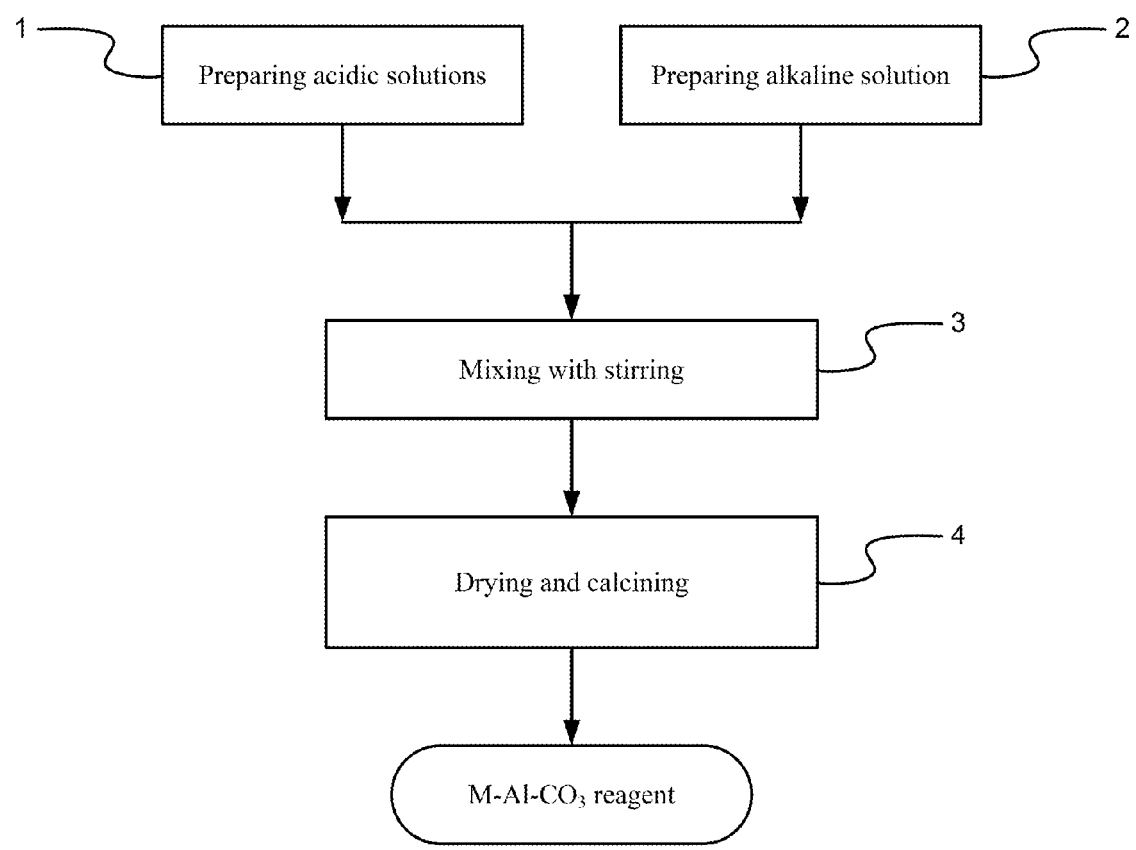
FIG. 1 is the flow view showing the preferred embodiment according to the present invention.
Figure 2:
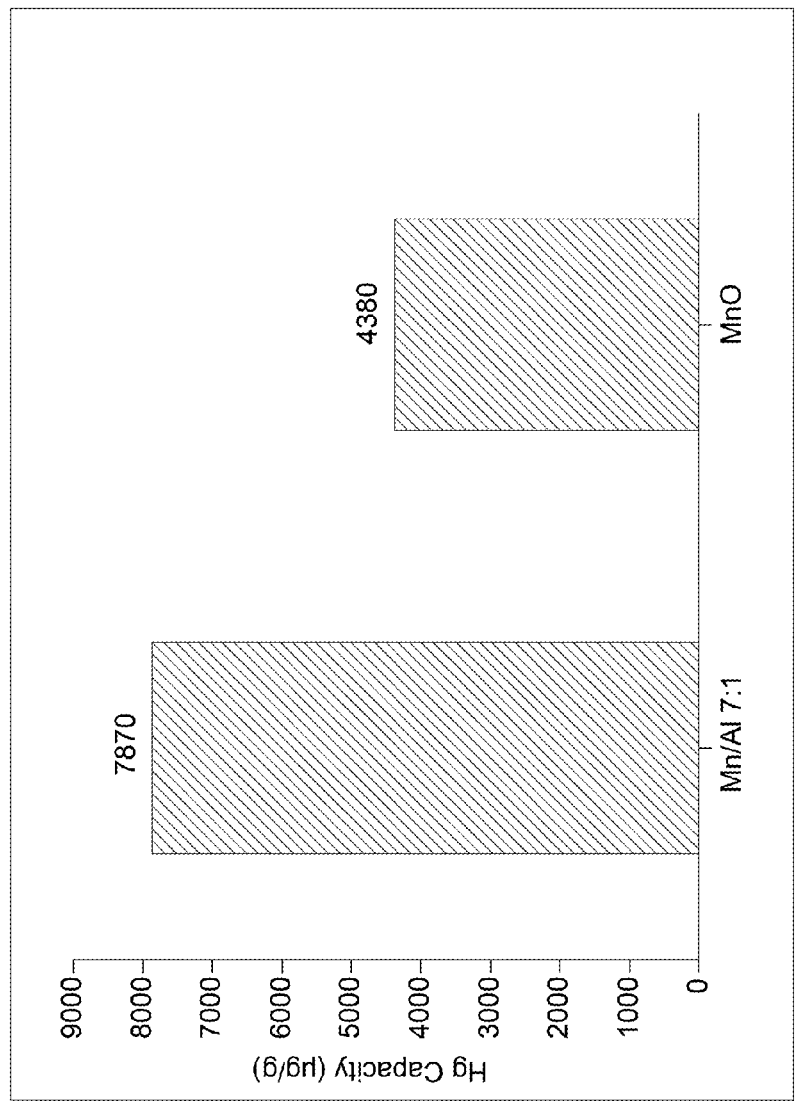
FIG. 2 is the view showing the comparison between Mn—Al—CO$_3$ and MnO on mercury adsorption capacity.

Please refer to FIG. 1 and FIG. 2, which are a flow view showing a preferred embodiment according to the present invention; and a view showing a comparison between Mn—Al—CO$_3$ and MnO on mercury adsorption capacity. As shown in the figures, the present invention is a method of fabricating a mercury-removing reagent having layers of carbonates, comprising the following steps:

(a) Preparing acidic solutions 1: A plurality of acidic solutions of a metal M and aluminum are prepared, where the acidic solutions have different molar ratios of the metal M to aluminum (M:Al$^{3+}$) of 1~30:1; aluminum is obtained from aluminum nitrate (Al(NO$_3$)$_3$); and the metal M is magnesium (Mg), calcium (Ca), manganese (Mn), iron (Fe), cobalt (Co), Nickel (Ni), copper (Cu) or zinc (Zn).

(b) Preparing alkaline solution 2: An alkaline solution of sodium hydroxide (NaOH) and sodium carbonate (Na$_2$CO$_3$) is prepared.

(c) Mixing with stirring 3: The acidic solutions are mixed with the alkaline solution to form precipitates of metal-M/aluminum carbonates (M-Al—CO$_3$) having the different molar ratios of M:Al$^{3+}$.

(d) Drying and calcining 4: After being dried and processed through solid-liquid separation, powders of M-Al—CO$_3$ having the different molar ratios of M:Al$^{3+}$ are obtained. The powders are put into a furnace for calcining to form an M-Al—CO$_3$ mercury-removing reagent.

Thus, a novel method of fabricating a mercury-removing reagent having layers of carbonates is obtained.

On using the present invention, acidic mixed-ion solutions having molar ratios of a metal to aluminum of 1~30:1 is prepared to be mixed with a proper amount of an alkaline solution having carbonate (CO$_3^{2-}$) and hydroxide (OH$^-$) to form precipitates. After being processed through solid-liquid separation and dried, powders containing carbonate oxides are formed. The carbonate powders are calcined into an M-Al—CO$_3$ mercury-removing reagent. On using the M-Al—CO$_3$ reagent, mercury is adsorbed at a room temperature of ~250 celsius degrees (° C.), where a removing ratio more than 90% under 0.1~10 parts per million (ppm) of mercury (Hg) and an average adsorption amount of 2,000~7,800 micrograms per gram (μg/g) at a temperature of 200° C. are achieved. Moreover, by increasing Hg concentration, the removing ratio can be further enhanced. For example, a mercury-removing reagent powder of Mn—Al—CO$_3$, which is fabricated according to the present invention and shown in the left side of FIG. 2, removes about 2-fold amount of Hg than the amount of Hg removed by a MnO powder, which is shown in the right side of FIG. 2. Under 0.1~40 ppm of Hg, an equilibrium adsorption up to 25 milligrams per gram (mg/g) is achieved.

The present invention provides a method to fabricate a mercury-removing reagent through coprecipitation. A main advantage of the method is to obtain an adjustable metal-containing ratio. Kilogram-grade manufacture is made possible. The present invention has a characteristic that common ions, like Mg, Ca, Mn, Fe, Co, Ni, Cu , Zn, etc. can be added with cost saved and the content ratio of metal oxides can reach more than 50 wt %. The mercury-removing reagent fabricated according to the present invention is operated at a temperature higher than 200° C. and can be potentially integrated with existing industrial denitration catalysts for removing Hg. Moreover, the present invention provides a mercury-removing reagent of M-Al—CO$_3$ to be combined with existing selective catalytic reduction (SCR) catalysts for removing Hg at a middle-high temperature and further enhancing mercury-removing efficiency.

To sum up, the present invention is a method of fabricating a mercury-removing reagent having layers of carbonates, where a mercury-removing reagent of M-Al—CO$_3$ is manufactured through coprecipitation; an adjustable metal proportion is a major advantage; kilogram-grade batch manufacture is made possible; common ions can be added with cost saved and metal oxide content ratio can be higher than 50 wt %; the reagent is operated at a temperature higher than 200° C. and can be integrated with existing industrial denitration catalysts for removing Hg; and the reagent can be combined with existing SCR catalysts for removing Hg at a medium-high temperature and further enhancing mercury-removing efficiency.

The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:

1. A method of fabricating a mercury-removing reagent having a metal carbonates compound with a layered structure, comprising steps of:

(a) preparing a plurality of acidic solutions of a metal M and aluminum, wherein said acidic solutions have different molar ratios of said metal M to aluminum (M:Al$^{3+}$) of 1:1 to 30:1; and wherein the aluminum is obtained from aluminum nitrate (Al(NO$_3$)$_3$); and wherein said metal M is selected from a group consisting of manganese (Mn) and iron (Fe);

(b) preparing an alkaline solution of sodium hydroxide (NaOH) and sodium carbonate (Na$_2$CO$_3$);

(c) stirring the acidic solutions with said alkaline solution to co-precipitate metal-M/aluminum carbonates (M-Al—CO$_3$) having said different molar ratios of M:Al$^{3+}$; and (d) after being dried and processed through solid-liquid separation, forming powders of metal-M/aluminum carbonates having said different molar ratios of M:Al$^{3+}$ and calcining said powders in a high-temperature furnace to obtain a mercury-removing reagent of M-Al—CO$_3$ capable of absorbing mercury at a temperature of approximately 250 Celcius degrees (° C.) with a mercury-removing ratio greater than 90 percent under 0.1 to 10 parts per million (ppm) of mercury and has an average mercury adsorption amount of 2,000~7,800 micrograms per gram (μg/g) at a temperature of 200° C.

\* \* \* \* \*